United States Patent [19]

Verbeij

[11] 3,914,650

[45] Oct. 21, 1975

[54] TELEVISION DISPLAY APPARATUS PROVIDED WITH A CIRCUIT ARRANGEMENT FOR GENERATING A SAWTOOTH CURRENT THROUGH A LINE DEFLECTION COIL

[75] Inventor: Oswald Johannes Verbeij, Eindhaven, Netherlands

[73] Assignee: U.S. Philips Corporation, New York, N.Y.

[22] Filed: Dec. 4, 1973

[21] Appl. No.: 421,514

[30] Foreign Application Priority Data

Jan. 2, 1973 Netherlands ........................ 7300001

[52] U.S. Cl. .................................. 315/371; 315/379

[51] Int. Cl.[2] ............................................ H01J 29/56

[58] Field of Search .......... 315/27 R, 27 TD, 276 D, 315/28, 29, 18, 370, 371, 364, 379

[56] References Cited

UNITED STATES PATENTS

| | | | |
|---|---|---|---|
| 3,689,797 | 9/1972 | Hetterscheid et al. | 315/276 D |
| 3,691,422 | 9/1972 | Boekhorst | 315/276 D |
| 3,748,531 | 7/1973 | Bockhorst et al. | 315/276 D |
| 3,803,447 | 4/1974 | Wolber | 315/27 SR |

*Primary Examiner*—Maynard R. Wilbur
*Assistant Examiner*—J. M. Potenza
*Attorney, Agent, or Firm*—Frank R. Trifari; Henry I. Steckler

[57] ABSTRACT

Television display apparatus including a circuit arrangement for combined line deflection and supply voltage stabilisation with the aid of means for field frequency modulation of the line deflection current, and a circuit arrangement for use in such television display apparatus.

10 Claims, 10 Drawing Figures

TELEVISION DISPLAY APPARATUS PROVIDED WITH A CIRCUIT ARRANGEMENT FOR GENERATING A SAWTOOTH CURRENT THROUGH A LINE DEFLECTION COIL

The invention relates to television display apparatus provided with a circuit arrangement for generating a sawtooth current through a line deflection coil forming part of a resonant network also including a trace capacitor and a retrace capacitor, switching means for applying the voltage across the trace capacitor to the deflection coil at the line frequency during the trace time of the sawtooth current, said switching means being blocked during the retrace time, a first current loop comprising a winding of an inductive element and a controllable switch for supplying energy originating from a direct voltage source to the inductive element during the conduction period of the switch and a second current loop comprising a diode and a winding of said inductive element which is connected through the diode to the resonant network, and a field deflection current generator.

Such a circuit arrangement is described in the publication "IEEE Transactions on Broadcast and Television Receivers", August 1972, volume BTR-18, No. 3, pages 177 to 182, and is the combination of a line deflection circuit and a switched supply voltage stabilising circuit in which a single controlled switch serves for fulfilling the two said functions. The circuit arrangement has the advantage that it can be fed with an unstabilised supply voltage and can supply a satisfactorily stabilised sawtooth current and a stabilised high voltage and possible auxiliary voltages. In the known circuit arrangement this stabilisation is obtained by applying the voltage across the trace capacitor as a control voltage to a driver circuit which supplies the switching pulses for the controllable switch (for example, a transistor) and which controls the conduction period of the switch under the influence of this control voltage.

Due to this stabilisation the known circuit arrangement cannot be used without any difficulty in arrangements, for example, colour television display apparatus in which the line deflection must undergo a so-called east-west modulation for correcting the raster distortion. It is possible to control the driver circuit with a field frequency varying signal in such a manner that the deflection current is modulated but this also results in an unwanted modulation of the high voltage and other auxiliary voltages generated with the aid of the circuit arrangement. The above-mentioned publication states that a possible solution is formed by the combination with a known modulator or with a separate EHT generator. As is known, in the first case the modulator and the circuit arrangement must form part of a bridge circuit and in the second case the said generator must be decoupled relative to the circuit arrangement. Alternatively, an EHT generator which is completely separated from the circuit arrangement can be used.

The said solutions lead to more or less complicated and hence costly combinations. It is an object of the present invention to provide a circuit arrangement which is very simple in which east-west modulation of the deflection current is possible without the high voltage and auxiliary supply voltages derived therefrom undergoing this modulation, while both the deflection current and the high voltage and the auxiliary supply voltages are stabilised against fluctuations of the supply voltage which is generally derived from the electric mains. The circuit arrangement according to the invention maintains the important advantage of the known arrangement, viz. that both the line deflection and the supply voltage stabilisation include one and the same switch. To realize the abovementioned advantages the circuit arrangement according to the invention is characterized in that a modulation source controlled by the field deflection current generator is incorporated in the second current loop for modulating the amplitude of the sawtooth current, the circuit arrangement furthermore including a stabilising circuit for maintaining the amplitude of the voltage occurring across the inductive element during the retrace time of the sawtooth current substantially constant by varying the conduction period of the switch.

In order to maintain the energy dissipated in the modulation source or to be supplied by this source sufficiently low and also to prevent the field frequency east-west modulation from covering a too large part of the admitted variation range of the conduction period of the controllable switch, the television display apparatus according to the invention is preferably furthermore characterized in that the said modulation source provides a line frequency voltage with line flyback pulses which are varied in amplitude in accordance with the field frequency.

The invention will further be described with reference to the Figures shown in the drawing.

FIG. 1 shows a first embodiment of a television display apparatus according to the invention, FIG. 2 shows some voltage and current curves to explain the operation of the embodiment of FIG. 1 and FIGS. 3 to 10 show other embodiments of circuit arrangements in a television display apparatus according to the invention.

The television display apparatus of FIG. 1 includes an RF tuner 1 for connection to an aerial 2, an IF amplifier 3, a detector 4 and a video amplifier with a color decoder 5 applying the color signals to a color display tube 6. This tube has a final anode 7 and is provided with a coil $L_Y$ for the horizontal (line frequency) deflection and with a coil $L'_Y$ for the vertical (field frequency) deflection.

Line synchronizing pulses which are applied to a line oscillator 9 and field synchronizing pulses applied to a field oscillator 10 are separated with the aid of a sync separator 8 from the output signal from detector 4. Oscillator 10 controls a field output stage 11 supplying the deflection current for the coil $L'_Y$. Line oscillator 9 controls a driver stage $D_r$ supplying switching pulses for a switching transistor $T_r$ of a line deflection output circuit to be further described.

A trace capacitor $C_1$ is arranged in series with line deflection coil $L_Y$ and a diode $D_1$ having the given conductivity direction and a retrace capacitor $C_2$ are connected in parallel with the series arrangement thus formed. The retrace capacitor $C_2$ may alternatively be arranged in parallel across coil $L_Y$. The said four elements only show the principle circuit diagram with the main components of the deflection section. This section may be provided, for example, in known manner with one or more transformers for mutual coupling of the elements, with circuits for centering and linearity correction and the like.

A secondary winding $L_2$ of a transformer A is in series with a diode $D_3$ whose cathode is connected to the junction of elements $D_1$, $C_2$ and $L_Y$ and to the anode of a diode $D_2$. The cathode of diode $D_2$ is connected to one end of a primary winding $L_1$ of transformer A and to the collector of transistor $T_r$ which is of the npn type. The positive terminal of a direct voltage source B is connected to the other end of winding $L_1$ and the negative terminal is connected to ground. The free ends of elements $D_1$, $C_2$, $C_1$ and the emitter electrode of transistor $T_r$ are also connected to ground.

A further winding $L_3$ is wound on the core of transformer A one end of which is connected to ground while the other end is connected to the anode of a rectifier $D_4$ whose cathode is connected to earth through a capacitor $C_3$. The output voltage of rectifier $D_4$ is applied to driver circuit $D_r$ for controlling the conduction period of the transistor $T_r$. Windings $L_1$ and $L_2$ preferably have the same number of turns. The winding sense of the transformer windings is denoted by polarity dots in the Figure.

A modulation source M is included between the end of winding $L_2$ remote from diode $D_3$ and ground. This modulation source includes an emitter follower transistor $T_r'$ arranged between said end of winding $L_2$ and ground and a capacitor $C_4$ connected in parallel across its emittercollector path as well as a driver stage $D_r'$ controlling the base electrode of transistor $T_r'$ which stage is connected to the field output stage 11. Driver stage $D_r'$ generates a field frequency parabolically varying modulation voltage $v_M$ from the signals of the field output stage and this voltage is also active through emitter follower $T_r'$ at the low side of winding $L_2$.

Modulation voltage $v_M$ serves for the east-west raster correction of the line deflection current. Voltage $v_M$ varies in accordance with the field frequency but may be considered as a constant voltage during a line period. Since the raster distortion to be corrected is generally pin-cushion shaped, it is known that the introduced modulation must be such that the amplitude of the line deflection current varies with a parabolic envelope with the peak of the parabola occurring in the middle of the field scan time and coinciding with the maximum amplitude.

Further windings are wound on the core of transformer A across which there are voltages which serve as supply voltages for other parts of the television display apparatus. One of these windings, winding $L_4$, is shown in FIG. 1 and generates the EHT for the final anode 7 of television display tube 6 with the aid of an EHT rectifier $D_5$ across a smoothing capacitance $C_5$. The supply voltages thus obtained as well as the EHT must not undergo the same field frequency modulation as the line deflection current. In addition, like this current, they must be stabilised against fluctuations of the voltage $V_B$ of source B generally derived from the electric mains. Both requirements are satisfied in accordance with the invention because the voltage across capacitor $C_3$ which is obtained by peak rectification of the flyback pulses present across winding $L_3$ is applied to driver circuit $D_r$. Driver $D_r$ includes a comparison stage and a modulator which ensure in known manner that the conduction period of transistor $T_r$ is varied.

The operation of the circuit arrangement of FIG. 1 will be explained with reference to the curves of FIG. 2. In FIG. 2a the voltage $v_2$ across capacitor $C_2$, in FIG. 2b the voltage $v_L$ across winding $L_2$ and in FIG. 2c the current $i_1$ through winding $L_1$ and the current $i_2$ through winding $L_2$ are plotted as a function of time with T denoting the line period. The retrace time is denoted by $t_r$ while $(1 - \delta)\, t_t$ denotes the part of the trace time $t_t$ during which transistor $T_r$ is cut off and $\delta\, t_t$ denotes the part where transistor $T_r$ conducts. As will be apparent the number $\delta$ is to be between 0.5 and 1.

After the commencement $t_o$ of the trace diode $D_1$ conducts. The voltage across capacitor $C_1$ is applied to deflection coil $L_Y$ so that a sawtooth deflection current flows through this coil. When the deflection current reverses its direction approximately in the middle of trace $t_t$, diode $D_1$ is blocked but in this case the deflection current flows through diode $D_2$ and the then conducting transistor $T_r$. Since the polarity of the deflection current is reversed approximately in the middle of trace $t_t$ and since it must be possible for the deflection current to flow unhampered through transistor $T_r$ during the second half of the trace, it will be evident that the instant $t_1$ when the transistor is rendered conducting is to be before the middle of the trace. This means that $\delta$ must be more than 0.5.

At the end $t_2$ of the trace transistor $T_r$ is cut off. A sinusoidal flyback voltage is produced across capacitor $C_2$. At an instant $t_o'$ the voltage $v_2$ becomes zero again so that diode $D_1$ is rendered conducting: this is the commencement of a new trace.

During the part $\delta\, t_t$ of the trace when transistor $T_r$ is conducting, a linearly increasing current $i_1$ flows through winding $L_1$. Thus current $i_1$ flows through transistor $T_r$ as well as the deflection current which flows via diode $D_2$ after the deflection current has reversed its direction. When at the instant $t_2$ transistor $T_r$ is cut off not only the current path for the deflection current but also that for current $i_1$ is interrupted. The latter results in a current $i_2$ flowing in secondary winding $L_2$ whose initial value (in case of equal numbers of turns between $L_1$ and $L_2$) is equal to the final value of $i_1$. The current $i_2$ renders diode $D_3$ conducting against the flyback pulse $v_2$ then occurring at the cathode of diode $D_3$. As a result the flyback pulse appears on the high side of winding $L_2$ and magnetically also on the low side of winding $L_1$, at the collector of transistor $T_r$ and at the cathode of diode $D_2$ which is blocked thereby.

Also after the instant $t_o$ when the retrace ends diode $D_3$ remains conducting until transistor $T_r$ is rendered conducting; current $i_2$ becomes zero and current $i_1$ starts to flow.

When $V_o$ is the direct voltage across capacitor $C_1$ if this has a sufficiently large capacitance or when it is the direct voltage component of the voltage across capacitor $C_1$ if this has a relatively low capacitance for the S—correction, then $V_o$ is equal to the mean value of $v_2$. In fact no direct voltage component can be present across coil $L_Y$. There applies:

$$V_o = \frac{1}{T} \int_0^{t_r} v_2 dt$$

Voltage $v_{L_2}$ is equal to the difference between the voltage at the anode of diode $D_3$ and modulation voltage $V_M$. During the interval between $t_o$ and $t_1$ the former voltage is zero (diodes $D_3$ and $D_1$ conduct) so that $v_{L_2} = -v_M$ so that the current $i_2$ is sawtooth-shaped while $$v_M = L_2 \frac{di_2}{dt}$$

with L = the inductance of the transformer on windings $L_1$ and $L_2$. During retrace $t_r$ the anode voltage of diode $D_3$ is equal to voltage $v_2$ because diode $D_3$ conducts so that $v_L = v_2 - v_M$ while current $i_2$ is given by $$v_2 - v_M = -L\frac{di_2}{dt}.$$

During the interval between $t_1$ and $t_2$ the collector voltage of transistor $T_r$ is zero so that voltage $V_B$ prevails across winding $L_1$ and hence across winding $L_2$. This voltage may be considered constant during a line period. In this interval the sawtooth current $i_1$ flows through the winding $L_1$ in which $$V_B = L\frac{di_1}{dt}.$$

The mean value of voltage $v_{L_2}$, i.e. the voltage across an inductor, must be zero. The surface in FIG. 2 shaded to the right must thus be equal to the surface shaded to the left so that there applies:

$$v_M(1-\delta)\,t_t + v_B\,\delta\,t_t \approx \int_0^{t_r} v_2 dt - v_M t_r$$

In this formula $V_o$ can be filled in:

$$V_oT = V_B\,\delta\,t_t + v_M(T - \delta\,t_t) \qquad (1)$$

Without east-west modulation voltage $v_{L_2}$ in the interval between $t_o$ and $t_1$ is equal to zero so that current $i_2$ is then constant and the second term disappears in the right-hand member of equation (1).

Since the voltage across $L_3$ is equal in shape to the voltage $v_{L_2}$ across $L_2$ and since the amplitude of the voltage across $L_3$ is rectified by the peak rectifier $D_4$, $C_3$ and the direct voltage thus obtained is applied to the driver stage $D_r$ for the control of the number δ, i.e. the conduction period of transistor $T_r$, the number δ varies in such a manner that the amplitude of the voltage across the winding $L_3$ and hence the amplitude $v_K = v_{2max} - v_M$ of voltage $v_{l_2}$ always remains constant. Since voltage $v_o$ dependent on the ratio $$z = \frac{t_r}{T}$$

is proportional to the amplitude $v_{2max}$ of voltage $v_2$, it follows from the foregoing that voltage $V_o$ and hence the amplitude of the deflection current varies with the variation of voltage $v_M$ which is desirable. On the other hand variations of supply voltage $V_B$ do not have any influence on voltage $V_o$. Formula (1) shows that the variation of the number δ accounts for both that of voltage $V_B$ and that of $v_M$. The amplitude $v_K$ always remains constant independent of the variations in the voltages $V_B$ and $v_M$. The same applies to the amplitudes of the voltages across winding $L_4$ and across the other windings (not shown) of transformer A. The EHT and the auxiliary supply voltages obtained in a corresponding manner are therefore not east-west modulated and are independent of the fluctuations in the main supply voltage $V_B$.

In a practical example supply voltage $V_B$ varies between approximately 240 and 340 V while the desired variation of voltage $V_o$ ranges from approximately 138 to 148 V. In case of a ratio $z = 0.15$ formula (1) becomes:

$$V_o - v_M = (V_B - v_M)\,\delta\,(1-z) = (V_B - v_M)\,0.85\,\delta \qquad (2)$$

and $$v_K = 10\,V_o - v_M$$

The mean value of voltages $V_B$ and $V_o$ are 290 V and 143 V, respectively. When the control of driver $D_r$ is adjusted by the voltage across $C_3$ in such a manner that the number δ is in the middle of its variation range, i.e. $\delta = 0.75$, there follows from formula (2) that the mean value of $v_M = -118$ V and from formula (3):

$$v_K = 10\,V_o - v_M = 1548\text{ V}. \qquad (4)$$

The other values of $v_M$ and δ can be calculated with the aid of formulas (2) and (4). At the extreme values of $V_B$ and $v_M$ we find:

$V_B = 340$ V
$V_o = 148$ V
$v_M = -68$ V
$\delta = 0{,}62$
and
$V_B = 240$ V
$V_o = 138$ V
$v_M = -168$ V
$\delta = 0{,}88$ Since the number δ remains within the admissible limits, i.e. 0.5 and 1 it is found that the circuit arrangement of FIG. 1 can be realized for the given variations of voltages $V_B$ and $V_o$. It is also found that voltage $v_M$ must always be negative so that the straight piece of the line between the instants $t_o$ and $t_1$ in FIG. 2b is located above the time axis while current $i_2$ in FIG. 2c will linearly decrease between the same instants.

In practice source M may be formed as a passive element. In fact, the current $i_2$ flowing through this element produces a negative voltage drop thereacross. Such an element may be a field frequency varying resistor, for example, formed as a controlled transistor. However, since current $i_2$ depends on the number δ and hence on voltage $V_B$, source M must have a low internal resistance so that voltage $v_M$ cannot be influenced by voltage $V_B$. Such a source is, for example, the transistor $T_r'$ arranged as an emitter follower which receives a field frequency parabola signal through the control circuit $D_r'$ in such a manner that the voltage at the junction of winding $L_2$ and transistor $T_r'$ is always negative relative to the earth potential and that the peak of the parabola in the middle of the field scan time is less negative than the values at the commencement and at the end of this time. A capacitor $C_4$ bypasses the said junction for line frequency signals.

It will be evident that in the arrangement of FIG. 1 diode $D_1$ may be replaced in known manner by the parallel arrangement of a transistor and a diode, in which the transistor must be line-frequency controlled, for example, by driver circuit $D_r$ and in which diode $D_2$ can be omitted. It is obvious that the operation remains the same. This also applies to the embodiments which will now be described.

Possible modifications of the known circuit arrangement are described in Netherlands Pat. application No. 7217254 (PHN 6677). Similar modifications are also possible with those of FIG. 1. In FIGS. 3 and 4 two of these modifications are shown in which the same reference numerals have been used for the same elements as in FIG. 1 and in which windings $L_1$ and $L_2$ are replaced by one winding L'. As described in the said Netherlands patent application these modifications have the advantage that a leakage inductance of the transformer A cannot have a detrimental influence. In FIG. 4 a capacitor $C_B$ operates as a supply voltage source whose charge is replented through a choke $L_B$ from direct voltage source B.

It is to be noted that in all modifications modulation source M forms part of a current loop which comprises windings $L_2$ and L' and diode $D_3$ and which is closed through the deflection section $D_1$, $C_2$, $L_Y$, $C_1$. In the modifications of FIGS. 4, 5, 6 and 7 modulation source M also forms part of the current loop comprising windings $L_1$ and L' and transistor $T_4$ and which is closed through direct voltage source B and the capacitor $C_B$ operating as a direct voltage source, respectively.

Since only the amplitude of the voltage across winding $L_3$ is maintained constant during the line flyback time it is only sufficient, according to a further aspect of the invention, to choose a field frequency varying voltage for the voltage $v_M$ which voltage occurs only during the said line retrace. Even a part thereof, namely just before and after the middle of the line retrace is sufficient. When in addition voltage $v_M$ is zero in the interval between $t_o$ and $t_1$ the power dissipated or supplied by the modulation source is also zero during this interval. The value of voltage $v_M$ in the interval between $t_1$ and $t_2$ is less important because diode $D_3$ is then blocked. A further advantage is that the variation of the number δ caused by the east-west modulation is slighter which has has been proved in practice.

Figure 8:
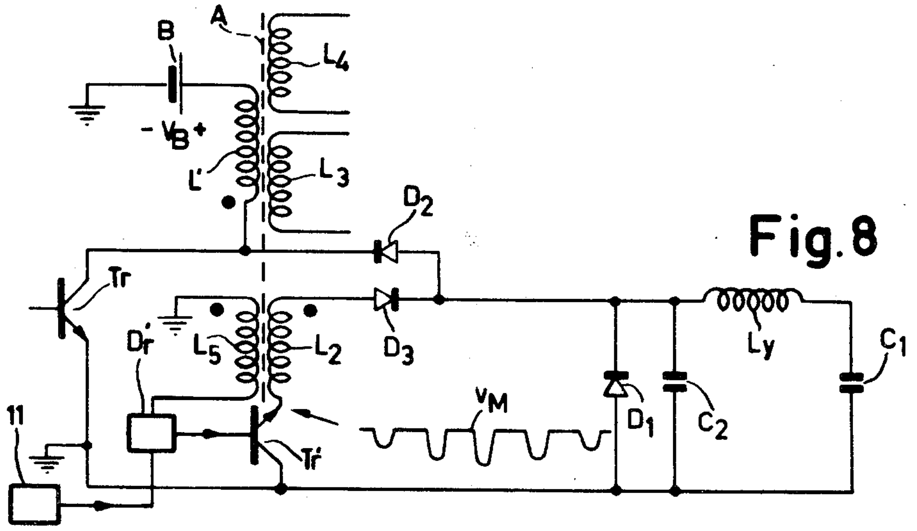

An embodiment of this principle is shown in FIG. 8. The modulation source now includes an extra transformer winding $L_5$ which applies negatively directed flyback pulses through the control circuit $D_r'$ to the emitter follower transistor $T'_r$. In control circuit $D_r'$ the attenuation or amplification of the flyback pulses is field frequency parabolically varied by means of the control from field output stage 11. The modulation voltage $v_M$ on the low side of winding $L_2$ thus consists of field frequency amplitude varying line flyback pulses causing the east-west modulation of the line deflection current. The positive voltage on the low side of winding $L_5$ during the time between $t_1$ and $t_2$ has no influence on the modulation voltage because then transistor $T_r'$ is saturated. During the entire line scan time modulation voltage $v_M$ is therefore equal to zero so that transistor $T_r'$ does not dissipate energy during this time. It can be proved that in this embodiment the conduction period (δ) of the transistor $T_r$ is only varied by supply voltage ($V_B$) variations and not by variations of the modulation voltage $v_M$. Instead of being derived from a transformer winding the flyback pulses for the control circuit $D_r'$ may alternatively be derived from the retrace capacitor $C_2$.

Figure 4:
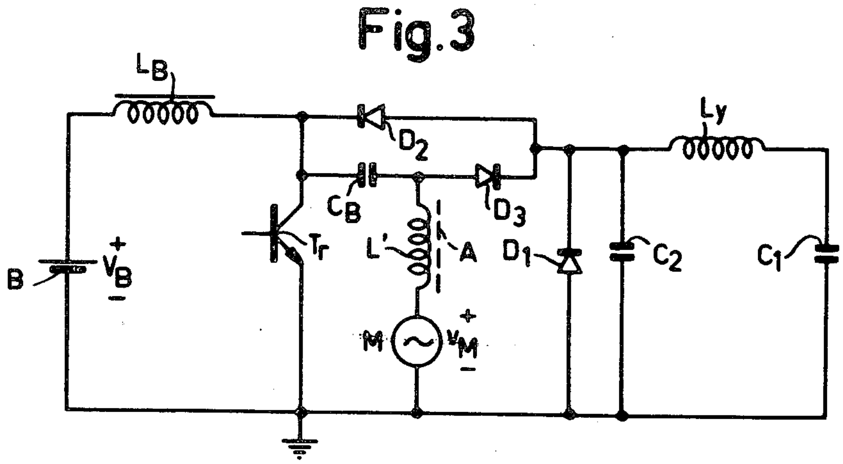
Figure 5:
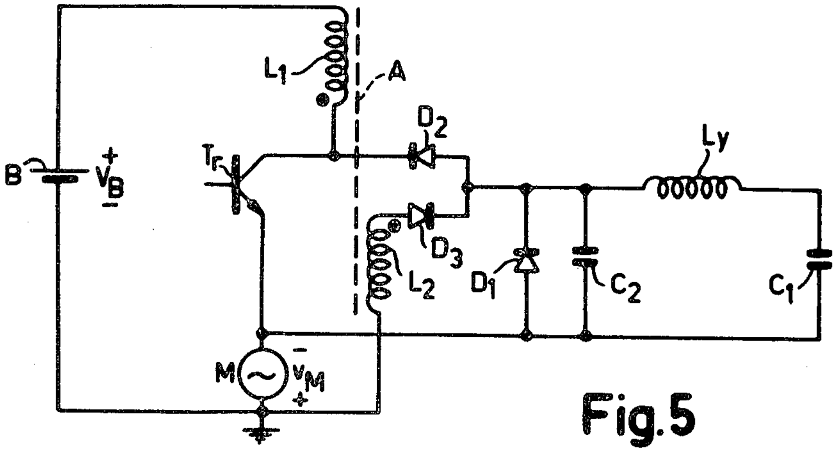
FIG. 5 shows an embodiment of the circuit arrangement according to the invention which has a similar operation as that of FIG. 1 with the difference that voltage $v_{L_2}$ between instants $t_1$ and $t_2$ is not equal to $-V_B$ but to $-(V_B + v_M)$. Similar formulas as those above may be derived explaining the variation of the number δ in case of variation of voltages $v_B$ and $v_M$.
Figure 6:
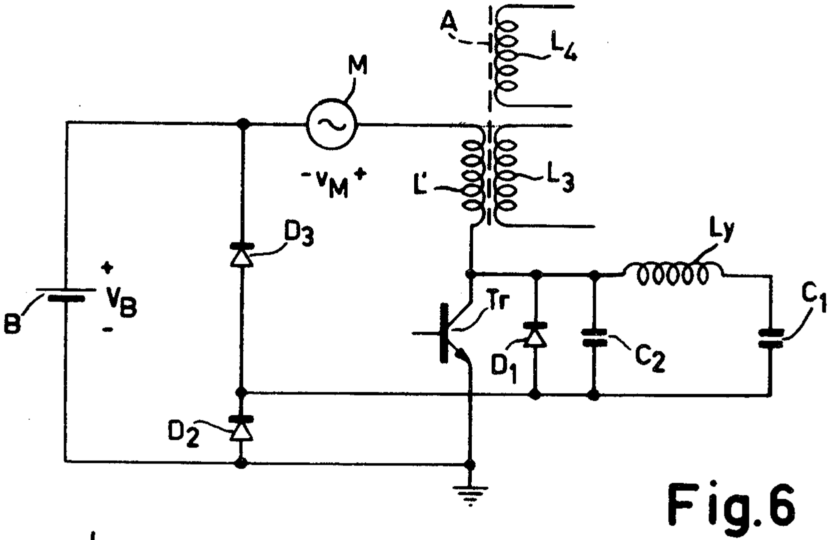
FIGS. 6 and 7 show modifications of the embodiment according to FIG. 5 which modifications are derived in the same manner from FIG. 5 as those of FIG. 3 and FIG. 4 are derived from FIG. 1.
Figure 7:
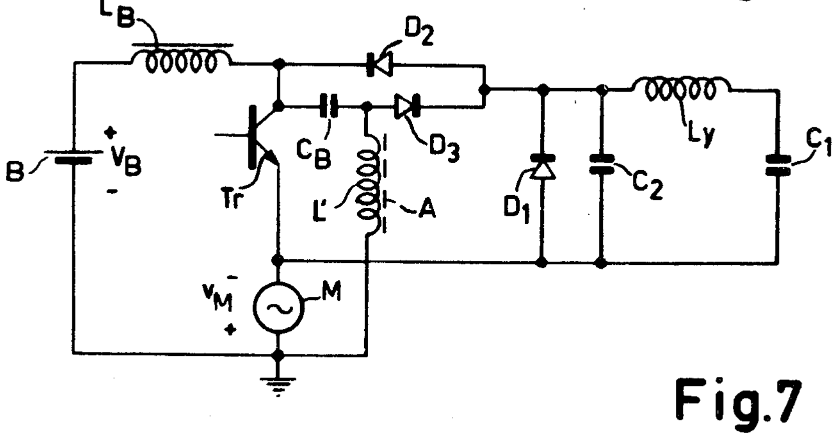
Figure 9:
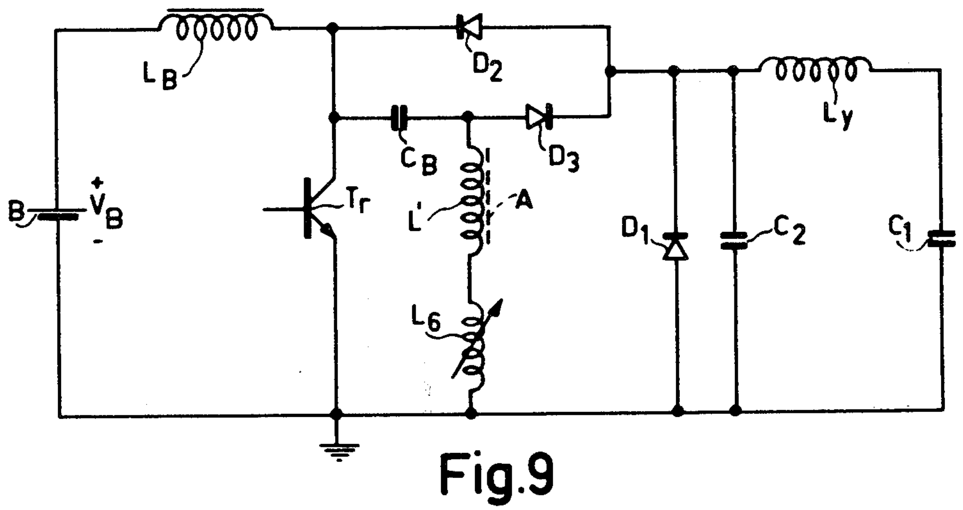

FIG. 9 shows another embodiment based on the same principle. The modulation source M of FIG. 4 is constituted in FIG. 9 by a coil $L_6$ whose inductance varies with the field frequency and parabolically. Such a coil is known and may be formed as a power winding of a saturable reactor whose control winding receives a field frequency current. A voltage is present across coil $L_6$ which voltage is a field frequency varying fraction of the voltage across the series arrangement of $L_6$ and L'. The latter voltage is equal to voltage $v_2$ during the retrace and in the interval between $t_o$ and $t_1$ this voltage is equal to zero and in the interval between $t_1$ and $t_2$ it is equal to the voltage $-V_B$ of capacitor $C_B$. The energy applied by inductor $L_6$ to the deflection section through $D_3$ during the retrace is repleted again from capacitor $C_B$ during the interval between $t_1$ and $t_2$. In the modulation method of FIG. 9 modulation source $L_6$ thus dissipates nothing except for the energy required for the control of this source.

Figure 1:
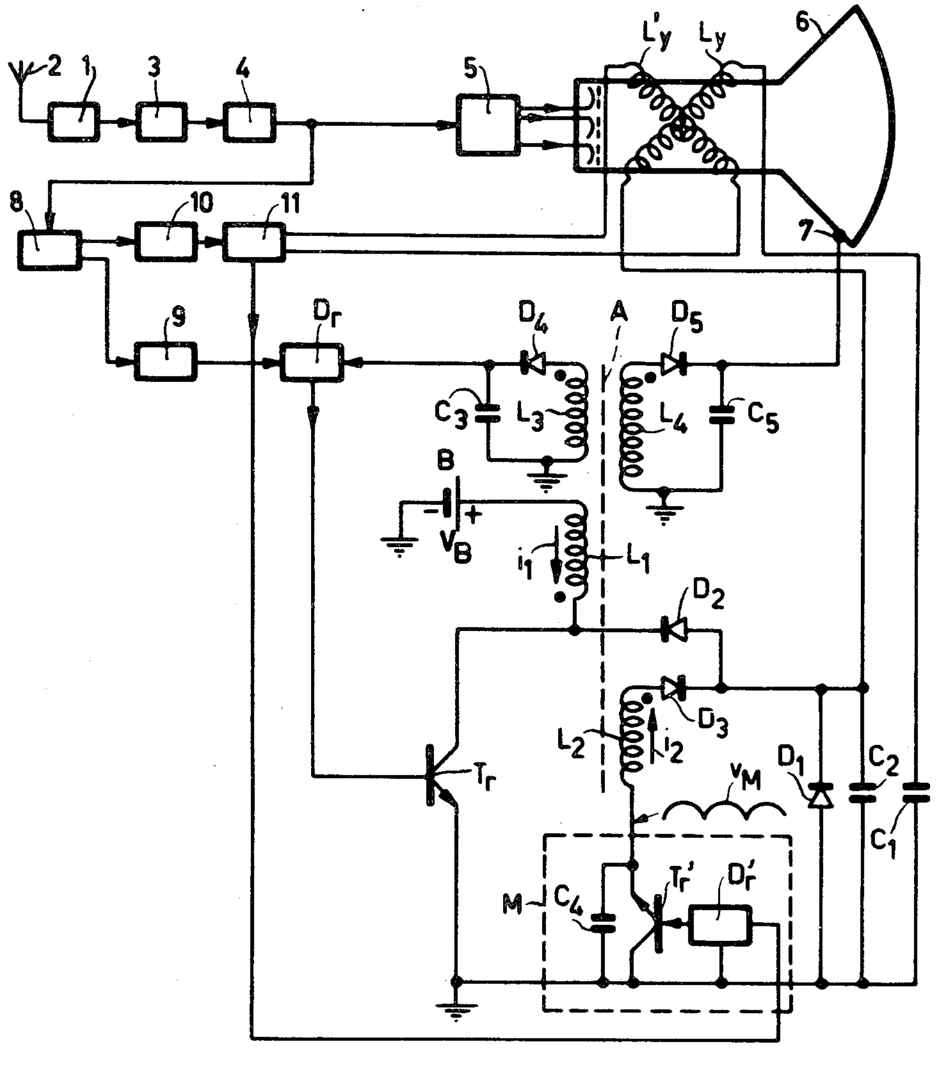
Figure 2:
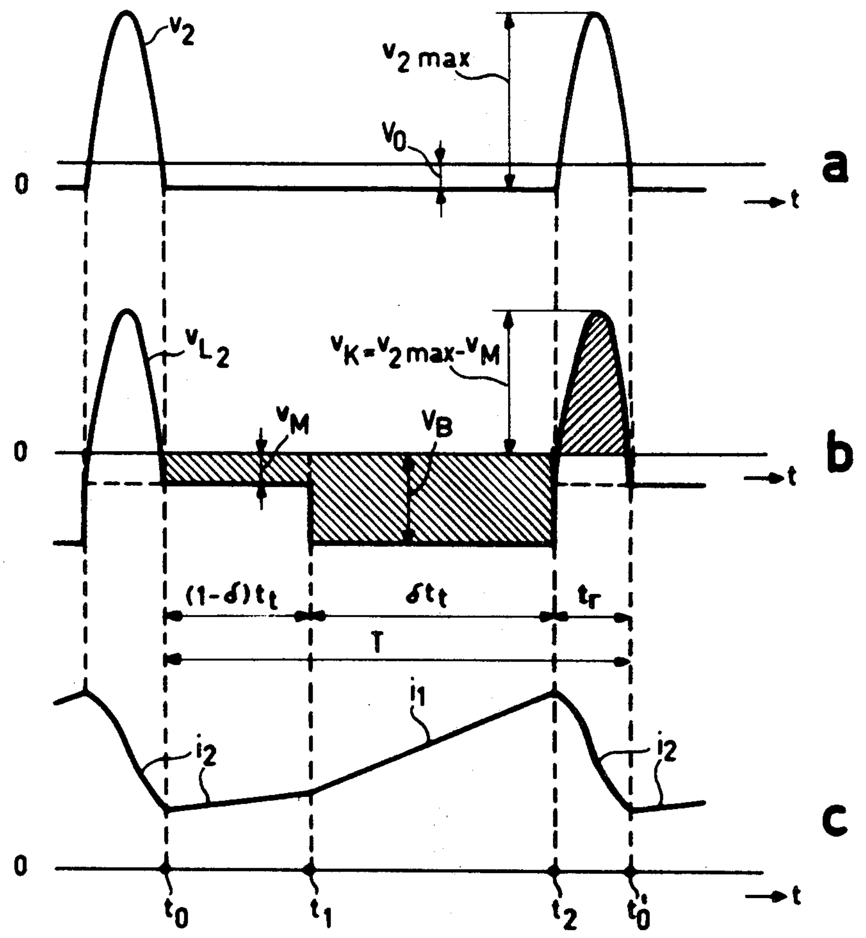
Figure 3:
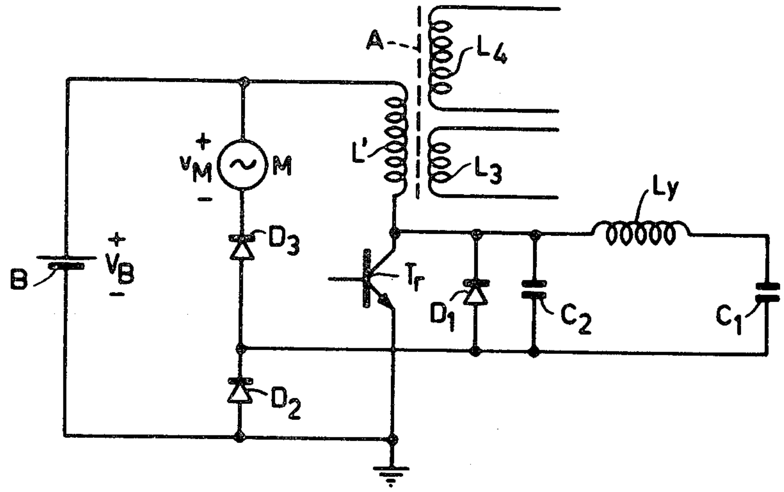
Figure 10:
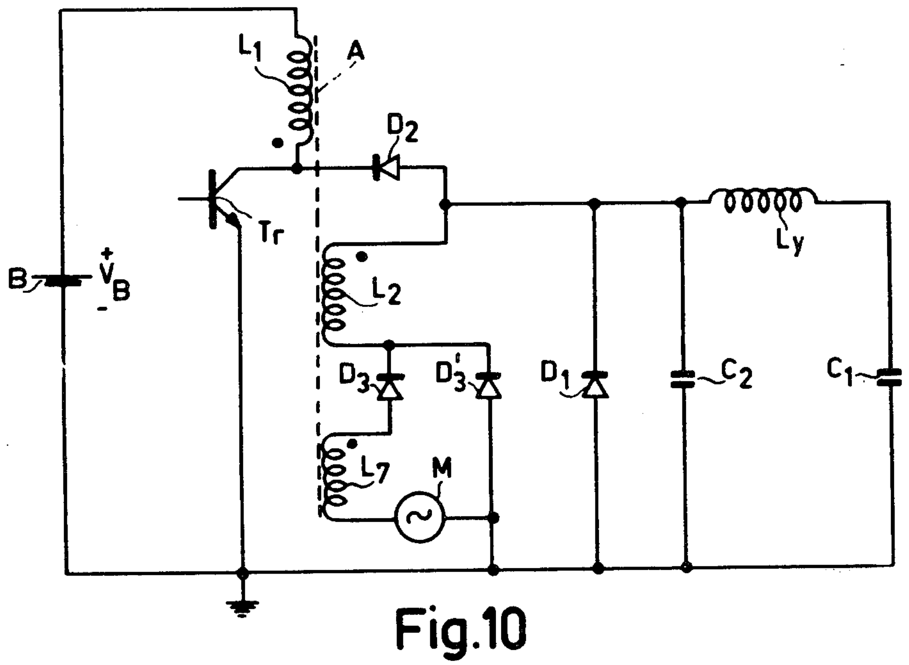

Another embodiment is shown in FIG. 10. Diode $D_3$ is displaced to the low side of winding $L_2$ and an additional transformer winding $L_7$ with considerably fewer turns than winding $L_2$ is arranged between diode $D_3$ and modulation source M. The cathode of a further diode $D_3'$ is connected to the cathode of diode $D_3$ and its anode is connected to earth. Modulation source M supplies a negative parabola field frequency varying direct voltage so that only the peaks of the flyback pulses across winding $L_7$ cause diode $D_3$ to conduct. Modulation source M thus is only active during these peaks in the current loop $L_7$, $D_3$, $L_2$ and the deflection section $D_1$, $C_2$, $L_Y$, $C_1$ and only during these peaks does source M supply or dissipate energy. During the other part of the retrace and during the interval between $t_o$ and $t_1$ of the trace diode $D_3'$ is conducting and takes over the normal function of $D_3$ of FIG. 1. Diodes $D_3$ and $D_3'$ are both blocked during the conducting period between $t_1$ and $t_2$ of transistor $T_r$.

What is claimed is:

1. Television display apparatus provided with a circuit arrangement for generating a sawtooth current through a line deflection coil forming part of a resonant network also including a trace capacitor and a retrace capacitor, switching means for applying the voltage across the trace capacitor to the deflection coil at the line frequency during the trace time of the sawtooth current, said switching means being blocked during the retrace time, a first current loop comprising a winding of an inductive element and a controllable switch for supplying energy originating from a direct voltage source to the inductive element during the conduction period of the switch and a second current loop comprising a diode and a winding of said inductive element which is connected through the diode to the resonant network and a field deflection current generator, characterized in that a modulation source controlled by the field deflection current generator is incorporated in the second current loop for modulating the amplitude of the sawtooth current, the circuit arrangement furthermore including a stabilizing circuit for maintaining the amplitude of the voltage occurring across the inductive element during the retrace time of the sawtooth current substantially constant by varying the conduction period of the switch.

2. Television display apparatus as claimed in claim 1, characterized in that the modulation source includes an emitter follower stage incorporated in said second current loop as well as a control device for field frequency controlling the emitter follower stage.

3. Television display apparatus as claimed in claim 1, characterized in that the modulation source supplies a line frequency voltage with line flyback pulses with a field frequency amplitude variation.

4. Television display apparatus as claimed in claim 3, characterized in that the modulation source supplies a line frequency voltage which is substantially zero at least during the part of the line trace time when the controllable switch is blocked.

5. Television display apparatus as claimed in claim 2 and characterized in that the modulation source supplies a line frequency voltage with line flyback pulses with a field frequency amplitude variation and line flyback pulses originating from a winding of the inductive element control the emitter follower stage through a field frequency amplification-controlled control circuit.

6. Television display apparatus as claimed in claim 3, characterized in that the modulation source is constituted by a controllable inductor, for example, the power winding of a saturable reactor.

7. Television display apparatus as claimed in claim 1, characterized by the series arrangement of the modulation source with a winding on the inductive element and with the third diode in which a further diode is present in parallel across the said series arrangement.

8. Television display apparatus as claimed in claim 1, characterized in that the modulation source is incorporated both in the first and in the second current loop.

9. Television display apparatus as claimed in claim 1, characterized in that the switching means consist of a parallel diode and the series arrangement of a series diode and the controllable switch connected in parallel therewith.

10. A circuit arrangement for generating a sawtooth current through a line deflection coil, said circuit arrangement comprising a trace capacitor and a retrace capacitor forming a resonant circuit with said coil; switching means for applying the voltage across the trace capacitor to the deflection coil at the line frequency during the trace time of the sawtooth current, said switching means being blocked during the retrace time; a first current loop comprising a winding of an inductive element and a controllable switch means coupled to said element for supplying energy originating from a direct voltage source to the inductive element during the conduction period of the switch; a second current loop comprising, a field deflection current generator, a diode, a winding of said inductive element coupled through the diode to the resonant network and to said field deflection current generator, and a modulation source means controlled by the field deflection current generator for modulating the amplitude of the sawtooth current; and a stabilizing circuit means for maintaining the amplitude of the voltage occurring across the inductive element during the retrace time of the sawtooth current substantially constant by varying the conduction period of the switch.

* * * * *